US009550932B1

(12) United States Patent
Kemp et al.

(10) Patent No.: US 9,550,932 B1
(45) Date of Patent: Jan. 24, 2017

(54) ADDITIVE FOR DRILLING FLUID USED AS A SHALE STABILIZING AGENT IN SUBTERRANEAN WELLBORES

(71) Applicant: WelDril Holdings, L.L.C., Muskogee, OK (US)

(72) Inventors: Nantelle P. Kemp, Muskogee, OK (US); Marwin K. Kemp, Muskogee, OK (US); Johnnie M. Kelley, Muskogee, OK (US); Graham A. Wilson, Muskogee, OK (US)

(73) Assignee: WELDRIL HOLDINGS, L.L.C., Muskogee, OK (US)

( * ) Notice: Subject to any disclaimer, the term of this patent is extended or adjusted under 35 U.S.C. 154(b) by 77 days.

(21) Appl. No.: 14/668,530

(22) Filed: Mar. 25, 2015

Related U.S. Application Data

(60) Provisional application No. 61/969,924, filed on Mar. 25, 2014.

(51) Int. Cl.
 *C09K 8/42* (2006.01)
 *C09K 8/035* (2006.01)
(52) U.S. Cl.
 CPC ............... *C09K 8/035* (2013.01); *C09K 8/42* (2013.01); *C09K 2208/12* (2013.01)
(58) Field of Classification Search
 None
 See application file for complete search history.

(56) References Cited

U.S. PATENT DOCUMENTS

| | | | | |
|---|---|---|---|---|
| 3,360,461 A | * | 12/1967 | Anderson | C08K 3/346 507/104 |
| 3,723,311 A | | 3/1973 | Lummus et al. | |
| 4,142,595 A | | 3/1979 | Anderson et al. | |
| 5,337,824 A | * | 8/1994 | Cowan | E21B 21/00 166/292 |
| 2004/0211563 A1 | * | 10/2004 | Brookey | C09K 8/50 166/292 |
| 2010/0230164 A1 | * | 9/2010 | Pomerleau | C09K 8/032 175/40 |
| 2014/0005079 A1 | * | 1/2014 | Dahanayake | C09K 8/035 507/118 |

FOREIGN PATENT DOCUMENTS

CA 972346 8/1975

OTHER PUBLICATIONS

Chang Min Jung, et al, High-Performance water based mud using nanoparticles for shale reserviours, Society of Petroleum Engineers, Conference Paper Abstract, 2013, 1 page.*

(Continued)

*Primary Examiner* — Alicia Bland
(74) *Attorney, Agent, or Firm* — Head, Johnson & Kachigian, P.C.

(57) ABSTRACT

An additive for drilling fluid used as both a sealing agent to prevent seepage loss and a shale stabilizing agent in subterranean wellbores. The additive includes ground bituminous coal having a selected particle size distribution wherein the bituminous coal is between 60% to 80% of the additive by weight. The additive also includes solvent extracted ground flaxmeal which is between 20% to 40% of the additive by weight.

5 Claims, 15 Drawing Sheets

(56) References Cited

OTHER PUBLICATIONS

Horsrud, P, et al, Interaction Between Shale and Water based Drilling fluids: Laboratory exposure tests give new insight into mechanisms and field consequences of KCI contents, Society of Petroleum Engineers, Conference Paper Abstract, 1998, 1 page.*

S Carminata, et al, Water-based mud and shale interactions, Society of Petroleum Engineers, Conference Paper Abstract, 2001, 1 page.*

Manohar Lal, et al, Shale stability: Drilling fluid interactino and shale strength, SPE 54356, Society of Petroleum Engineers, 1999, 10 pages.*

Sandra Gomez and Arvind Patel, M-I Swaco, A Schlumberger Company; Shale Inhibition: What Works? Society of Petroleum Engineers; Doc. ID: 164108-MS; Content Type: Conf. Paper; Source: 2013 SPE Int'l. Symposium of Oilfield Chemistry, Apr. 8-10, 2013, The Woodlands, TX, USA; ISBN: 978-1-61330-231-9; Copyright: 2013 http://www.onepetro.org/mslib/app/Preview.do?paperNumber=SPE-164108-MS.

Willams, Jr., Lewis H., Baker Sand Control, Underdown, David R., Baker Sand Control; New Polymer Offers Effective, Permanent Clay Stabilization Treatment; Society of Petroleum Engineers; Doc. ID: 8797-PA; Content Type: Journal Paper; Journal: Journal of Petroleum Technology; vol. 33, No. 7; Date: Jul. 1981; Copyright: 1981; http://www.onepetro.org/mslib/servlet/onepetropreview?id=00008797.

Wikipedia, The Free Encyclopedia Shale http://en.wikipedia.org/wiki/Shale.

* cited by examiner

Figure 13

| | Fluid Properties of 16.9 ppb Bentonite Drilling Fluids | | | | | | | |
|---|---|---|---|---|---|---|---|---|
| Additive | Additive, ppb | PV, dynes/cm2 | YP, lb/100ft2 | 10s gel, lb/100ft2 | 10m gel, lb/100ft2 | Syringe test, mL | Syringe test, penetration, mL | API Modified, 30 m, mL |
| None | 0 | 6.4 | 5.2 | 1.3 | 9.5 | 20.0 | 24.0 | 140.0 |
| VF | 4 | 6.4 | 5.4 | 1.3 | 8.8 | 9.0 | 24.0 | 29.5 |
| MG Fine | 4 | 7.1 | 6.0 | 1.8 | 9.6 | 4.5 | 24.0 | 36.0 |
| MGSS 80/20 | 4 | 8.0 | 8.9 | 3.8 | 11.5 | 0.5 | 24.0 | 34.0 |
| MGSS 70/30 | 4 | 9.1 | 10.0 | 4.6 | 12.5 | 0.0 | 24.0 | 32.5 |
| MGSS 60/40 | 4 | 11.0 | 10.9 | 6.0 | 13.7 | 0.0 | 18.0 | 30.0 |
| Treated Uintaite (1) | 4 | 6.9 | 6.7 | 2.0 | 10.3 | 10.5 | 24.0 | 57.0 |
| Treated Uintaite (2) | 4 | 7.1 | 6.9 | 2.1 | 10.0 | 0.0 | 22.0 | 45.0 |

Figure 14

| Additive | Fluid Properties of 1 ppb X-C/5%KCl Drilling Fluids | | | | | | | |
|---|---|---|---|---|---|---|---|---|
| | Additive, ppb | PV, dynes/cm2 | YP, lb/100ft2 | 10s gel, lb/100ft2 | 10m gel, lb/100ft2 | Syringe test, mL | Syringe test, penetration, mL | API Modified, 30 m, mL |
| No Additive | 0 | 4.1 | 7.5 | 2.3 | 2.5 | 23.5 | 24.0 | 146.0 |
| VF | 5 | 4.8 | 8.4 | 2.9 | 3.1 | 10.0 | 24.0 | 37.0 |
| MG Fine | 5 | 4.7 | 8.4 | 2.9 | 4.0 | 0.0 | 18.0 | 20.0 |
| MGSS 80/20 | 5 | 5.8 | 8.9 | 3.5 | 3.7 | 0.5 | 24.0 | 18.5 |
| MGSS 70/30 | 5 | 5.9 | 9.9 | 3.9 | 4.2 | 0.0 | 17.0 | 18.0 |
| MGSS 60/40 | 5 | 6.0 | 10.4 | 3.9 | 7.0 | 0.0 | 14.0 | 15.0 |
| Treated Uintaite (1) | 5 | 4.5 | 8.4 | 2.7 | 2.8 | 24.0 | 24.0 | 68.0 |
| Treated Uintaite (2) | 5 | 4.3 | 7.8 | 2.4 | 2.5 | 0.0 | 15.0 | 42.5 |

Figure 15

| | Shale Recoveries | | | | |
|---|---|---|---|---|---|
| Bentonite | 16.9 ppb, Test Set 1 | | X-C/KCl | 1 ppb/5%, Test Set 1 | |
| Additive | Additive, ppb | Shale Recovery | Additive | Additive, ppb | Shale Recovery |
| None | 0 | 61.24 | None | 0 | 75.41 |
| VF | 4 | 62.55 | VF | 5 | 78.29 |
| Treated Uintaite (1) | 4 | 66.20 | Treated Uintaite (1) | 5 | 84.38 |
| Bentonite | 16.9 ppb, Test Set 2 | | X-C/KCl | 1 ppb/5%, Test Set 2 | |
| None | 0 | 80.99 | None | 0 | 48.47 |
| MGSS 80/20 | 4 | 87.39 | MGSS 80/20 | 5 | 72.70 |
| Treated Uintaite (1) | 4 | 83.84 | Treated Uintaite (1) | 5 | 57.79 |

ADDITIVE FOR DRILLING FLUID USED AS A SHALE STABILIZING AGENT IN SUBTERRANEAN WELLBORES

CROSS REFERENCE TO RELATED APPLICATIONS

This application claims priority to U.S. Provisional Application Ser. No. 61/969,924, filed Mar. 25, 2014, which is incorporated herein by reference.

BACKGROUND OF THE INVENTION

1. Field of the Invention

The present invention relates to an additive for drilling fluid shown to be effective as both a sealing agent to reduce seepage loss and a shale stabilizing agent in subterranean wellbores.

2. Prior Art

Drilling fluid or drilling "mud" is utilized during downhole drilling operations. The drilling fluid is pumped down from the surface to the drill tip location and then circulated back to the surface in a continuous operation. The drilling fluid helps lubricate and cool the drill bit during the drilling operation and also carries the drill cuttings to the surface.

Wellbore stability in the drilling of oil and gas wells has been studied for years. Despite numerous studies and many proposed solutions, maintaining a stable wellbore remains a problem. A literature survey showed numerous papers in 2013 alone devoted to this area.

Wellbore stability is particularly a problem when drilling shale. Shale is defined as "a fine-grained, clastic sedimentary rock composed of mud that is a mix of flakes of clay minerals and tiny fragments (silt-sized particles) of other minerals, especially quartz and calcite." See http://en.wikipedia.org/wiki/Shale and Blatt, Harvey and Robert J. Tracy (1996) "Petrology: Igneous, Sedimentary and Metamorphic", $2^{nd}$ ed., Freeman, pp. 281-292. According to Lal, Manohar (1999) "Shale Stability: Drilling Fluid Interaction and Shale Strength", Society of Petroleum Engineers 54356, 1999 SPE Latin American and Caribbean Petroleum Engineering Conference, Caracas, Venezuela, 21-23 Apr. 1999, "shales make up over 75% of the drilled formations and over 70% of the borehole problems are related to shale instability." The type and amount of clay in the shale are major causes of wellbore stability problems because clays can interact with the water in the drilling fluid.

Wellbore instability can occur for several reasons, some of which are listed below:

Changes in Mechanical Stress and Rock Strength.
During the drilling process, rock is removed and replaced by drilling fluid. This changes the mechanical forces acting on the remaining rock.

Differential Pressure Changes.
The column of fluid in the wellbore generates a pressure on the surrounding rock that can be greater or less than the pressure of the fluid inside the rock. The difference in pressure can cause fluid movement either into or out of the rock.

Osmotic Pressure Differences.
The water in the rock, both internal to the clays and in the pore spaces, will normally have a certain amount of salinity as measured by its water activity. If the drilling fluid has a significantly different salinity, water will tend to move into or out of the rock, depending on whether the drilling fluid is less saline (higher water activity) or more saline (lower water activity) than the formation water.

Changes in the Clay Structure from Ionic Substitution.
Various hydrated cations (sodium, potassium, calcium, and others) are sandwiched between the silicate layers in clays found in shale, holding the layers together by static charge. Because a potassium cation (K+) is more closely surrounded by its waters of hydration, the clay layers in a K+ containing clay will be more tightly held together. If this type of clay comes in contact with a fluid containing a large amount of sodium ion (Na+), the Na+ will become substituted for the K+, and the clay layers will be less tightly held together. Conversely, if a Na+ containing clay comes in contact with a fluid containing K+, the K+ will substitute for the Na+, and the clay structure will be strengthened. Too much K+ substitution can actually cause the clays to shrink and introduce fractures in the shale. See Horsrud, P. et al., "Interaction Between Shale and Water-Based Drilling Fluids: Laboratory Exposure Tests Give New Insight into Mechanisms and Field Consequences of KCl Contents", Society of Petroleum Engineers 48986, 1988 SPE Annual Technical Conference and Exhibition, New Orleans, La., 27-30 Sep. 1998.

Swelling of the Clays.
When the clays in shale absorb water, they tend to swell, increasing the hydraulic pressures in the system.

Fractures in the Shale.
Fractured shale and weak bedding planes facilitate the movement of fluid into the shale and allow more contact of drilling fluid with the clays.

Generally speaking, the major way to stabilize shale is to prevent or reduce the interaction of the water in the drilling fluid with the shale. Much of the fluid interaction is time-dependent. That is, the longer the shale is exposed to the drilling fluid, the more likely problems are to develop. Limiting shale exposure to water can be key to preventing wellbore failure.

One successful mechanism for limiting shale exposure to water is to use oil-based or synthetic drilling fluids containing organic low-polar fluids. Oil-based drilling fluids are generally water-in-oil emulsions with the water phase containing a salt such as calcium chloride. In drilling water-wet shales, capillary forces of oil-based muds prevent fluid invasion. See Lal, Manohar, ibid. In addition, the salt concentration in the water phase can be matched to the shale water activity to reduce or eliminate osmotic effects. Drilling fluid density can be adjusted to reduce differential pressures. Ionic substitution is prevented by the presence of the oil surrounding the water droplets of the emulsion. However, oil-based drilling fluids are expensive and may have environmental impacts and disposal problems that limit their use in some cases.

In water-based drilling fluids, because the water comes in direct contact with the shale, a variety of mechanisms have been attempted in order to limit the water interaction with the clays. Potassium chloride (KCl) is frequently used as a component. When used in moderate concentrations, the ionic substitution of K+ for Na+ in the clays can help strengthen the clays and delay hydration. The presence of KCl, sodium chloride (NaCl), or some other salt will also lower the water activity of the fluid, reducing the osmotic tendency of water to migrate into the shales.

Similarly, organic cationic amine compounds have been developed which displace the existing cations in the clay structure and exclude water molecules. See Gomez, Sandra and Patel, Arvind, "Shale Inhibition: What Works?", Society of Petroleum Engineers 164108, SPE International Symposium on Oilfield Chemistry, The Woodlands, Tex., 8-10 Apr. 2013. Polymeric amine shale inhibitors are longer versions of these amines with multiple cationic sites for binding. Their larger molecular size, however, prevents them from penetrating the clay layers as well as their smaller counterparts. Adsorption is primarily on the surface of the clay.

The use of poly-cationic materials to provide shale stabilization is not new. In the introduction of their paper, Williams and Underdown discuss using multisited cationic materials to more permanently stabilize shales. See Williams, Lewis H. and Underdown, David R., "New Polymer Offers Effective, Permanent Clay Stabilization Treatment", Society of Petroleum Engineers 8797, Journal of Petroleum Technology, July 1981, pp. 1211-1217. They reference partially hydrolyzed polyacrylamide (PHPA) (Scheuerman, Canadian Patent No. 972,346) Halliburton Services CLA-STA™ and flaxmeal as examples of these materials. See Anderson, D. B. and Edwards, C. D., "Fluid Development for Drilling Sloughing and Heaving Shales", Petroleum Engineer, September 1977, pp 105-118; Anderson, et al. (U.S. Pat. No. 4,142,595); and Lummus et al. (U.S. Pat. No. 3,723,311).

In their patent, Anderson et al. (U.S. Pat. No. 4,142,595) show the effectiveness of using flaxmeal in a KCl, polymer-viscosified drilling fluid system on maintaining shale integrity of several different shales after rolling 16 hours in the fluid. Several other materials were also tested, but found to be less effective than flaxmeal. In addition to rolling shale samples for 16 hours in the inhibitive fluid, the recovered shale was rolled for an additional 2 hours in fresh water. The flaxmeal/KCl combination was found to continue to protect the shale even after rolling in fresh water.

Plugging of pore holes is also a potential mechanism for reducing fluid migration into the wellbore. However, pores in shales are very small (3-100 nm) (see Lal, Manohar, ibid.) with average pore sizes in the 10 to 30 nm range (see Jung, Chang Min, et al., "High-Performance Water-Based Mud Using Nanoparticles for Shale Reservoirs", Society of Petroleum Engineers 168799, Unconventional Resources Technology Conference, Denver, Colo., 12-14 Aug. 2013). Among other rules for sizing particles for bridging, Hands et al. proposed that the $D_{90}$ of the bridging particles should be equal to or less than the pore size of the rock (the size of 90% of the particles should be equal to or less than the pore size). See Hands et al., "Drill-In Fluid Reduces Formation Damage, Increases Production Rates", Oil and Gas Journal (July 1998). For reference, the particle size of bentonite and barite, commonly used in water-based muds, are in the 0.1 to 100 micron range (100-100,000 nm), much too large for effective filter cake formation or plugging. Jung et al. and others have suggested using nanoparticles in water-based fluids for this purpose. See Ji, L. et al., "Drilling Unconventional Shales with Innovative Water-Based Mud—Part I: Evaluation of Nanoparticles as Physical Shale Inhibitor", AADE-12-FTCE-50, AADE Fluid Technical Conference, Houston, 12-14 Apr. 2011.

On the other hand, fractures in shales are potentially much larger than the pore holes. Preventing fluid from entering such fractures is also important in delaying clay hydration and time-dependent shale instability. Ground materials such as uintaite (commonly known as Gilsonite) and sized calcium carbonate have been used for this purpose. Anderson et al. recommended the use of treated uintaite as a means of sealing off microfractures in the shale. See Anderson et al., ibid.

Pomerleau (U.S. Patent Publication No. 2010/0230164) addressed lost circulation, seepage loss, and fluid loss control. The patent describes the use of ground pumice, barium, dolomite, anthracite or a combination of these materials in drilling fluids. The patent covers a very broad range of particle sizes (between 100 and 4,000 microns) and an extremely wide range of concentrations (0.01 to 300 ppb). While the patent does advocate anthracite as one possible additive, it does not mention bituminous coal, which is softer than anthracite. Further, as will be described, the present invention has a much more restricted particle size range as well as concentration range.

Notwithstanding the foregoing, there remains a need to provide an additive for drilling fluids which will more effectively operate both as a shale stabilizing agent and a seepage loss agent in subterranean wellbores.

Accordingly, it would be desirable to provide an additive for drilling fluids which would both prevent seepage loss and act as a shale stabilizing agent in subterranean wellbores.

SUMMARY OF THE INVENTION

The present invention is directed to an additive for drilling fluid used as both a sealing agent to reduce seepage loss and a shale stabilizing agent in subterranean wellbores.

The additive is composed of ground bituminous coal having a selected particle size distribution. The bituminous coal is between 60% to 80% of the additive by weight. Ground flaxmeal is solvent extracted in order to remove oil from the flaxmeal. The solvent extracted ground flaxmeal in the additive is between 20% to 40% of the additive by weight.

The additive is utilized in the drilling fluid at a rate of between 3 to 6 pounds per barrel.

BRIEF DESCRIPTION OF THE DRAWINGS

FIG. 13 is a table showing the fluid properties of various additives in bentonite drilling fluids;

FIG. 14 is a table showing fluid properties of various additives polymer/potassium chloride drilling fluids; and FIG. 15 is a table illustrating shale recovery for various additives tested.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the description herein and in the figures, the following codes are applied as follows:

Code Table
VF—Very Fine Grind Additive
CG—Cement Grade Additive
MG Coarse—Mud Grade Coarse Grind Additive
MG Medium—Mud Grade Medium Grind Additive
MG Fine—Mud Grade Fine Grind Additive
MGSS 80/20—80% MG Fine+20% Flaxmeal by weight
MGSS 70/30—70% MG Fine+30% Flaxmeal by weight
MGSS 60/40—60% MG Fine+40% Flaxmeal by weight In a mud grade coarse grind additive, the selected particle size distribution of ground bituminous coal has 25% of its particles less than 75 microns and a median particle size of around 170 microns.

In a mud grade medium grind additive, the selected particle size distribution of bituminous coal has 35% of its particles less than 75 microns and a median particle size distribution of around 100 microns.

In a mud grade fine grind additive, the selected particle size distribution of ground bituminous coal has 50% of its particles less than 75 microns and a median particle size of around 75 microns.

Experimental Results:

A variety of additive grinds were tested individually and in combination with ground, solvent-extracted flaxmeal. The results were compared to commercially available treated and untreated uintaite additive. The grinds tested were VF and MG Fine. The MG Fine was also combined with ground flaxmeal in 80/20 weight ratio, 70/30 weight ratio, and 60/40 weight ratio of bituminous coal to flaxmeal.

Particle Size Analysis.

Figure 1:
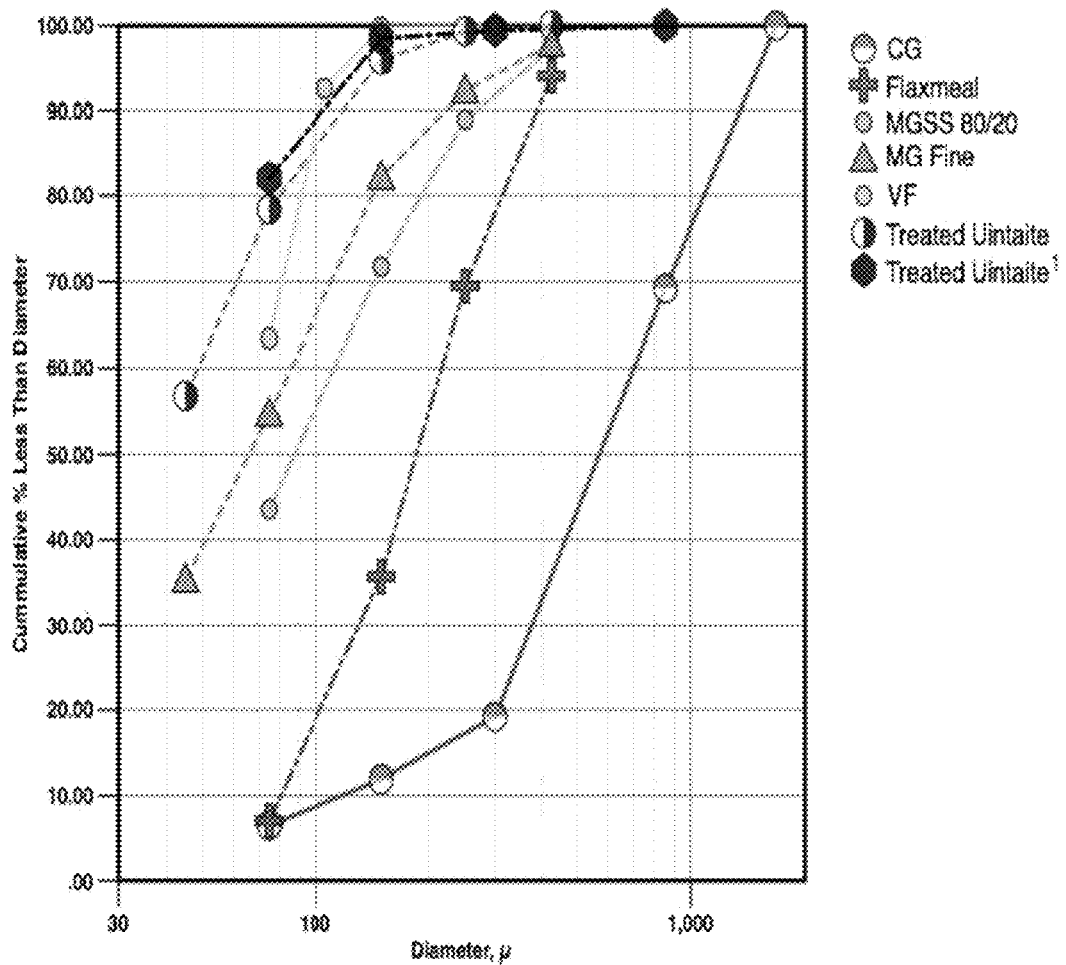
FIG. 1 is a graph or chart showing particle size distribution for various additive mixtures, including additives of the present invention.

The particle size distribution of various products is shown in the graph or chart in FIG. 1. The particle size diameter is shown on the X axis. The cumulative percentage (%) less than the nominal diameter is shown on the Y axis.

As can be seen in FIG. 1, VF (yellow) is similar in particle size to the treated uintaite additive (black) while MG Fine (orange) is somewhat larger in particle size. The ground flaxmeal (blue) has a somewhat sharper distribution, larger than MG Fine. For comparison, the much larger CG is also shown.

Note that all products, including treated uintaite additive, are much larger than would be successful in plugging shale pore sizes. However, they are fine enough to potentially plug fractures in shale.

Figure 2:
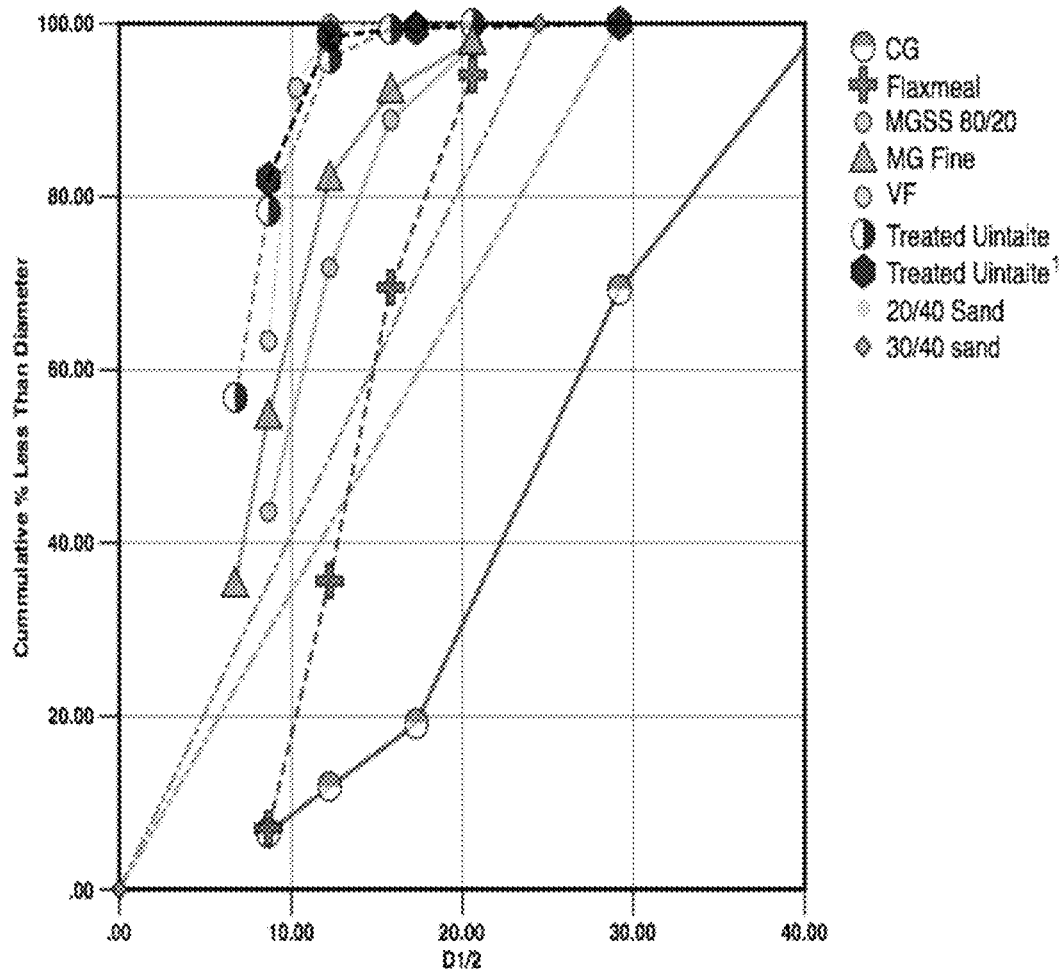
FIG. 2 is a graph or chart showing particle size distribution for various additive mixtures as a function of the square root of the diameter.

FIG. 2 shows a graph or chart of the particle size distribution as a function of the square root of the diameter ($D^{1/2}$). The square root of the diameter is shown in the X axis. The cumulative percentage (%) less than the nominal diameter is shown on the Y axis.

According to Ideal Packing Theory (IPT), "ideal packing occurs when the percent of cumulative volume vs. the $D^{1/2}$ forms a straight-line relationship, where $D^{1/2}$ is the square root of the particle diameter." See Dick, M. A., Heinz, T. J., Svoboda, C. F., Aston, M., "Optimizing the Selection Bridging Particles for Reservoir Drilling Fluids", SPE 58793, 2000 SPE International Symposium on Formation Damage, Lafayette, La., 23-24 Feb. 2000, and Kaeuffer, M., "Determination de L'Optiumum de Remplissage Granulometrique et Quelques Proprietes S'y Rattachant", presented at Congres Internationa de l'A. F. T. P. V., Rouen, October 1973.

FIG. 2 also includes lines from the origin to the ideal calculated maximum size particle (850µ and 600µ; $D^{1/2}$=29 and 24µ, respectively) for each sand used in the sealing tests described below to the origin (the two straight lines starting at 0). IPT says that ideally sized materials for sealing the sands would have a straight line section coinciding with these lines. A mixture of MG Fine and the flaxmeal would be closer to the ideal lines than MG Fine by itself.

Rheology and Sealing:

Various additives were tested in a simple 16.9 ppb bentonite drilling fluid system. Approximately four (4) pounds per barrel of additive (ppb) was used in each case. A range of 3 to 6 pounds per barrel has proved to be effective. The results are summarized in the table in FIG. 13.

Figure 3:
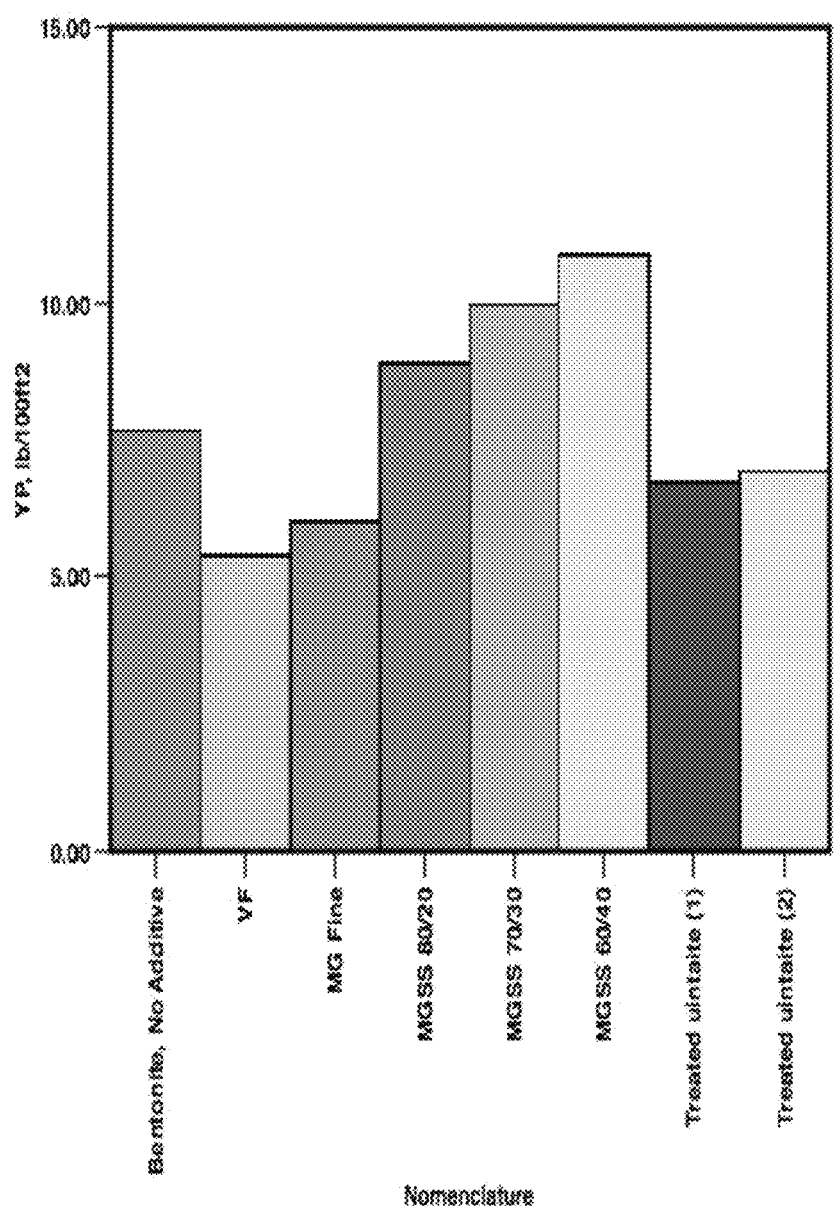
FIG. 3 is a graph or chart showing the yield points for various additives in a bentonite drilling fluid system.

1. Rheology: Standard viscosity measurements were taken after aging overnight at room temperature. Rheological properties increased somewhat over the base bentonite fluid. In particular, the more flaxmeal that was present in the additive, the higher the rheological properties were. As an example, the yield points for the various additive mixtures tested are shown in the graph or chart in FIG. 3.

2. Syringe Test: In this test, 20/40 sand is placed in a 60 mL syringe. The test fluid is introduced at the top and pressure is applied to see how far the fluid travels in the sand and whether fluid comes through at the bottom. If fluid is expelled, the penetration is listed as 24 mL and the amount of fluid is measured. A detailed description of the test is given below.

Figure 4:
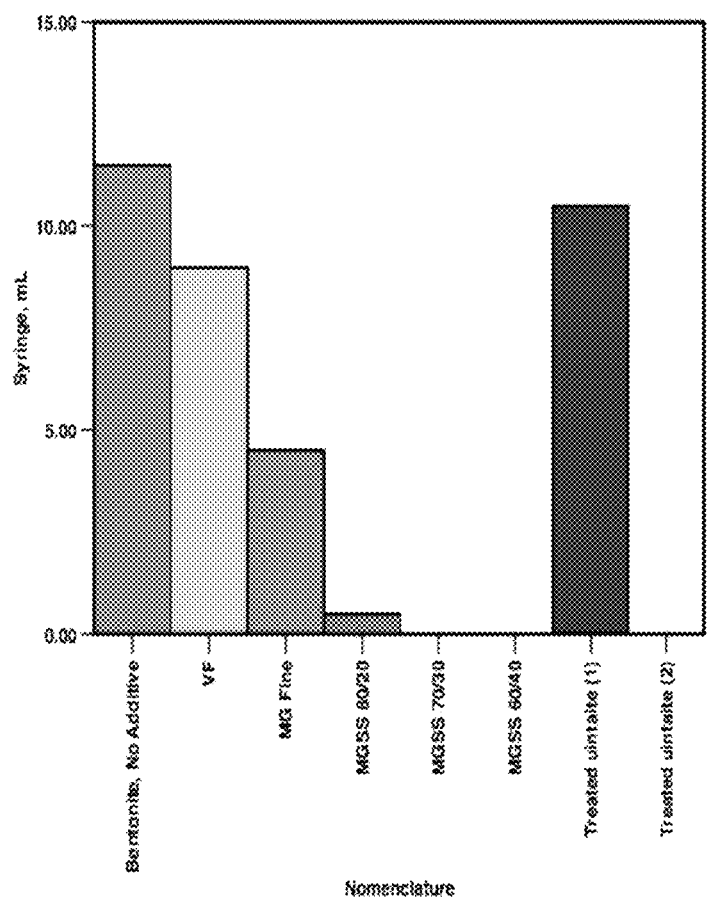
FIG. 4 is a graph or chart illustrating the results of a syringe fluid loss test for the products in a bentonite drilling fluid system.

As shown in the graph or chart in FIG. 4, the base bentonite fluid exhibited no sealing with essentially all the fluid being expelled. The two finest materials, VF and one sample of treated uintaite sealed somewhat but still allowed 9 and 10.5 mL of fluid to be expelled, respectively. MG Fine allowed only 4.5 mL to be expelled. The fluids containing the combination bituminous coal/flaxmeal sealed even better with little or no fluid being expelled, comparable to the other sample of treated uintaite. The fluids containing the combination bituminous coal/flaxmeal sealed even better with little or no fluid being expelled.

3. Modified API Fluid Loss: In the modified API fluid loss test, the fluid loss is measured through a 1-inch bed of 30/40 sand instead of through filter paper. A detailed description is given below.

Figure 5:
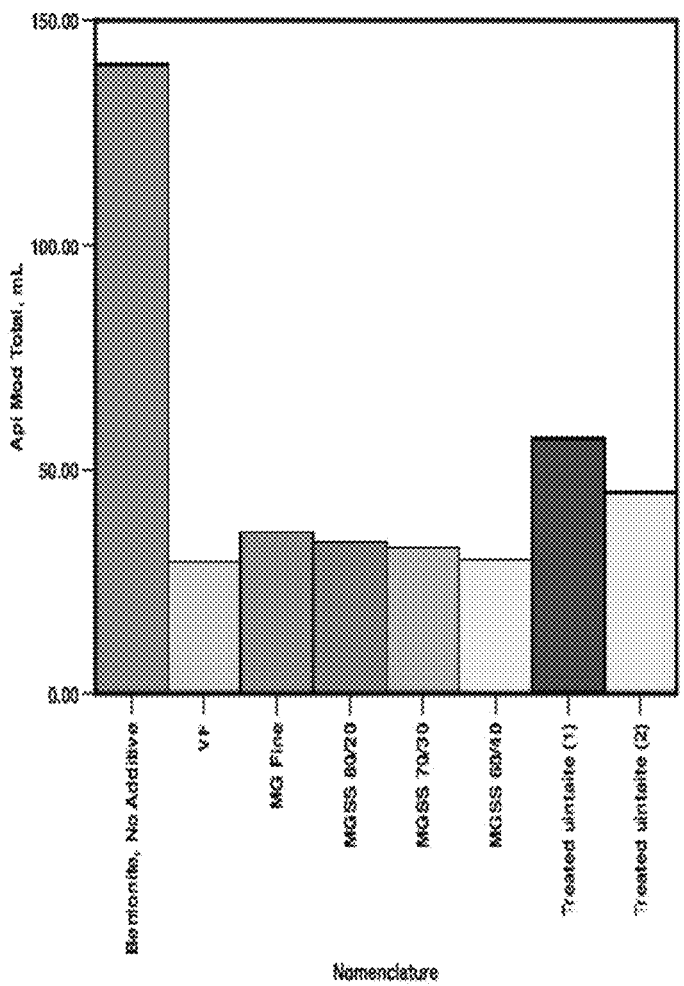
FIG. 5 illustrates a graph or chart of a fluid loss in a modified API fluid loss test of the tested products in a bentonite drilling fluid system.

As seen in the chart or graph in FIG. 5, all of the fluids containing bituminous coal additives showed much better sealing than the treated uintaite additive. The various combination bituminous coal/flaxmeal blends were very similar in behavior in this test with possibly slight improvement in sealing as the flaxmeal content was increased. However, the differences may just be experimental variation.

X-C Polymer Drilling Fluid Systems:

Tests similar to those described above were performed on X-C polymer drilling fluid systems containing various bituminous coal products and on treated uintaite. The base drilling fluid contained 1.0 ppb X-C polymer, 5% KCl, and 30 ppb Rev Dust to simulate drill solids. Rev Dust was added because previous work has shown that X-C polymer systems containing no drill solids do not seal well even with high product concentrations. RevDust is a clay material used as a substitute for drill solids encountered in actual operations. The results showing the fluid properties are shown in the table in FIG. 14.

Figure 6:
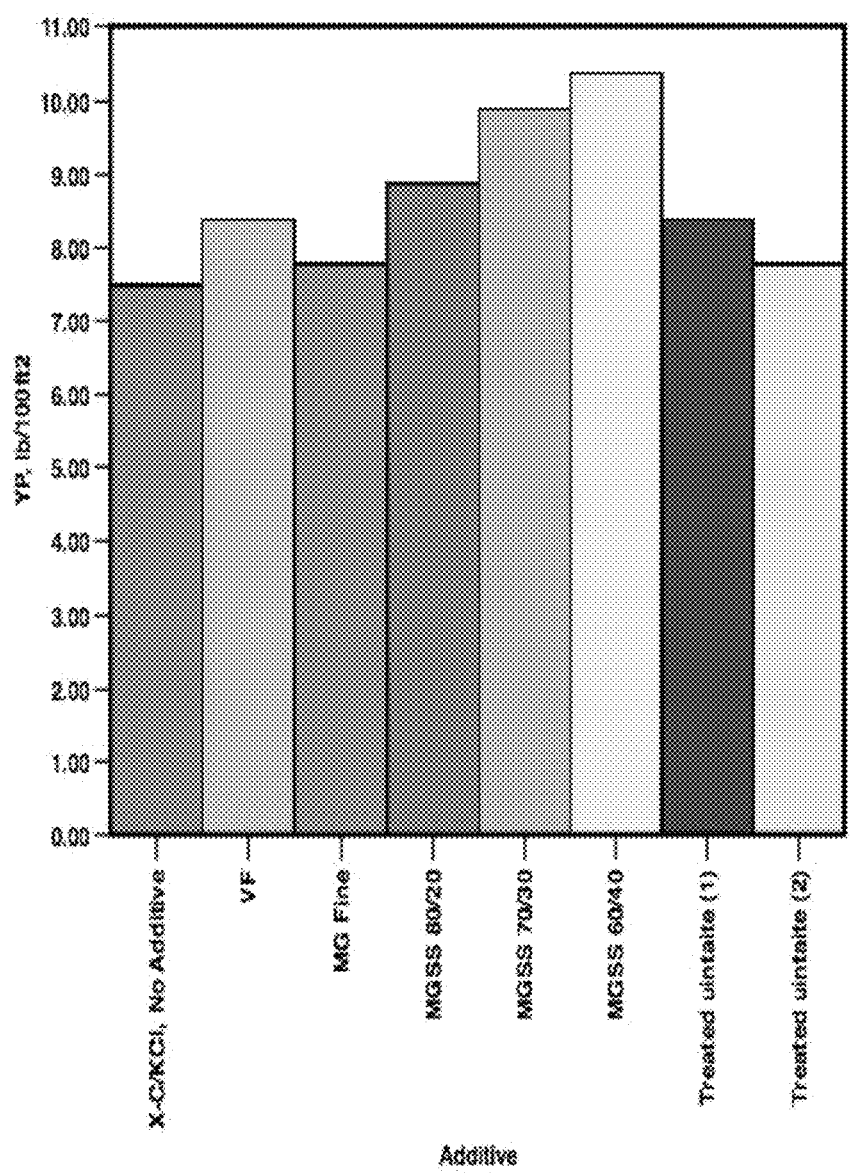
FIG. 6 illustrates a graph or chart of the yield points for various additives in a polymer/potassium chloride drilling fluid system.

1. Rheology: After aging overnight, standard rheological properties were measured. As shown in the table in FIG. 14, the fluids all had similar properties with a slight increase in viscosity and gel strengths as the flaxmeal content increased. FIG. 6 illustrates the yield points for the various additives.

Figure 7:
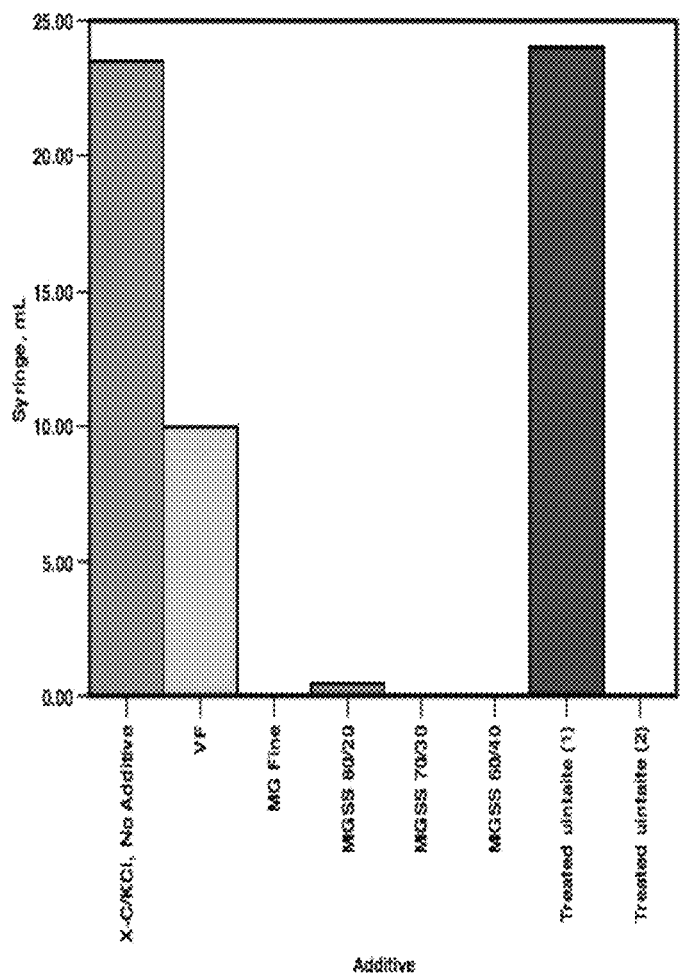
FIG. 7 illustrates a graph or chart of a syringe fluid loss test for a polymer/potassium chloride drilling fluid system.

2. Syringe Test: The syringe test was performed on the fluids after aging overnight at room temperature. The results are shown in the graph or chart in FIG. 7.

Neither the base drilling fluid nor one of the uintaite additives containing fluid exhibited sealing in this test. The VF additive showed some sealing capability allowing 10 mL of fluid to be expelled. The MG Fine and its combinations with flaxmeal all sealed with little or no fluid being expelled.

Figure 8:
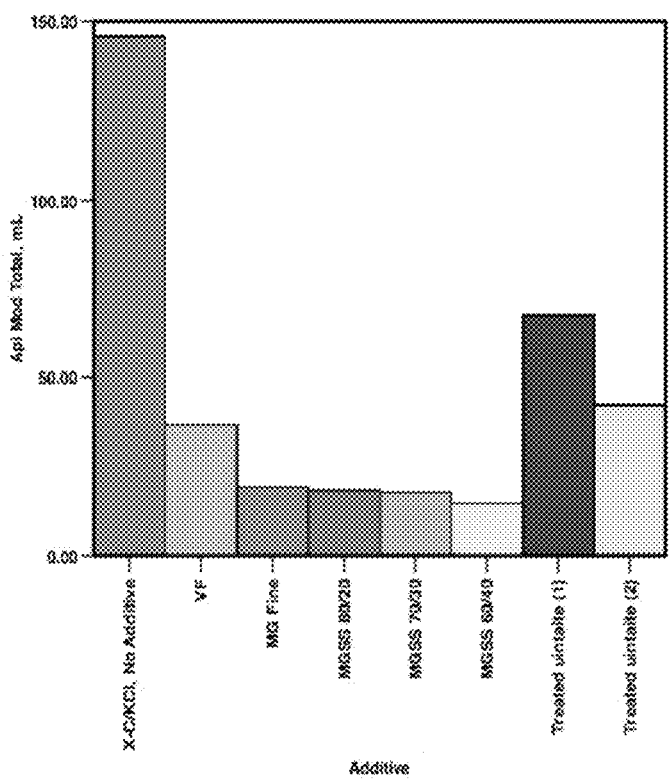
FIG. 8 illustrates a graph or chart of fluid loss in a modified API fluid loss test for a polymer/potassium chloride drilling fluid system.

3. Modified API Fluid Loss: The modified API fluid loss test in which the normal filter paper is replaced by a one inch layer of 30/40 sand was conducted on the various fluids. The results are shown in the graph or chart in FIG. 8. As in the syringe test, the untreated fluid showed essentially no sealing behavior.

All of the MG and MGSS additives tested exhibited sealing with 37 mL of fluid or less being expelled. Some slight decrease in fluid quantity is seen as the flaxmeal content increased. This may be the result of the flaxmeal modifying the particle size distribution making it closer to ideal. However, the differences are small and may not be significant. All of the materials sealed significantly better than either uintaite additive.

Shale Stability Tests:

An independent third party laboratory facility conducted roller oven shale stability tests on several products and uintaite using Pierre II Shale. The additives were at a rate of between 3 to 5 pounds per barrel of drilling fluid. The tests were conducted following the procedure outlined in API Recommended Practice 131. The aging cells containing Pierre II shale and test fluid were hot rolled for 16 hours at 250° F. The results are shown in the table in FIG. 15 and the graphs or charts in FIGS. 9 through 12.

Pierre II shale would be expected to be relatively unstable in water. Carmiati et al. reported on a sample of Pierre II shale which was 64% clay with half of that being reactive smectite. See Carminati, S. et al., "Water-Based Muds and Shale Interactions", Society of Petroleum Engineers 65001, 2001 SPE International Symposium on Oilfield Chemistry, Houston, Tex., 13-16 Feb. 2001.

Two different samples of Pierre Shale were used in the tests. Because these are natural materials, variations in reactivity will occur when using different samples.

Figure 9:
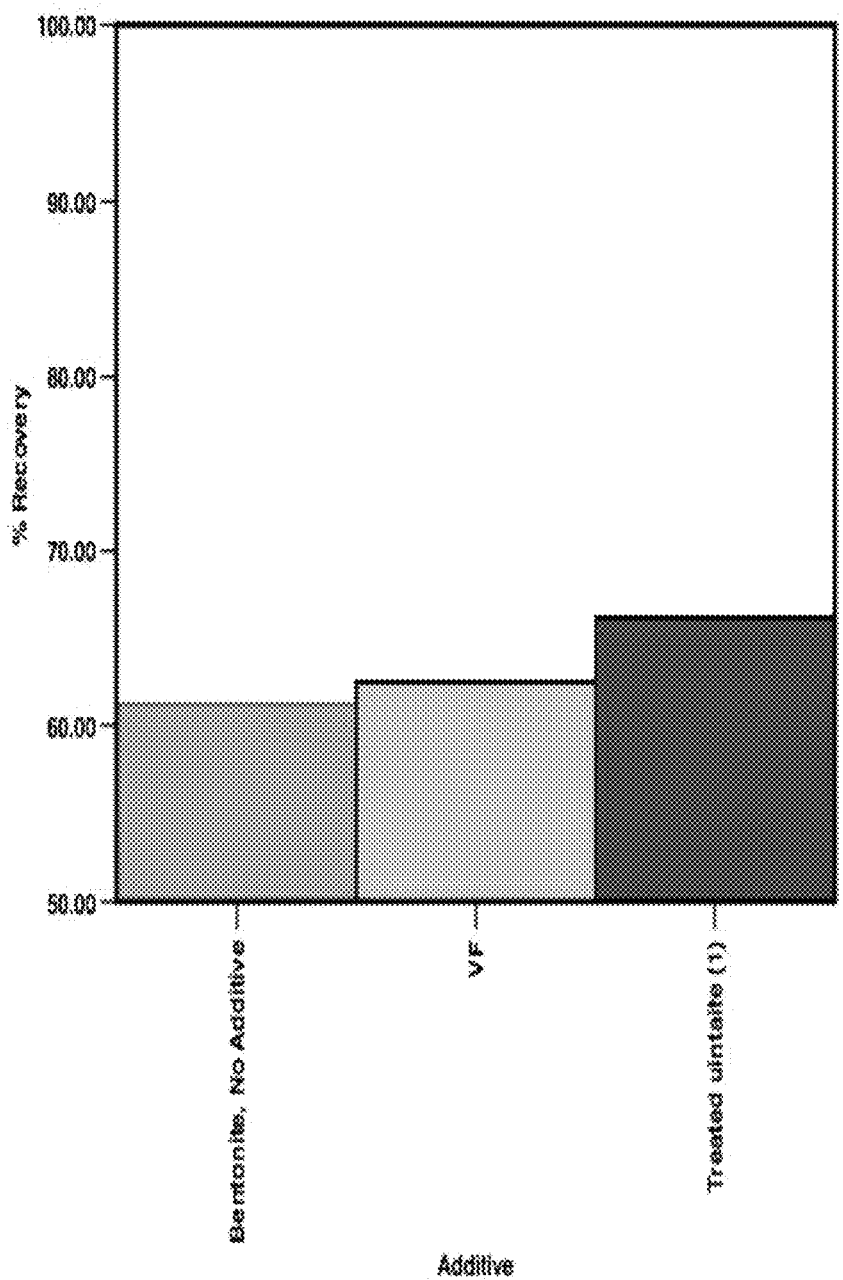
FIG. 9 is a graph or chart illustrating shale stability for a bentonite drilling fluid system with a first shale sample.

Shale Recovery in Bentonite:

In the first set of tests shown in FIG. 9, VF was compared to treated uintaite. These two materials have similar particle sizes. Neither demonstrated much better recovery of the shale than the base drilling fluid (61.2% recovery), but the uintaite (66.2% recovery) was slightly better than the VF (62.6% recovery).

Figure 10:
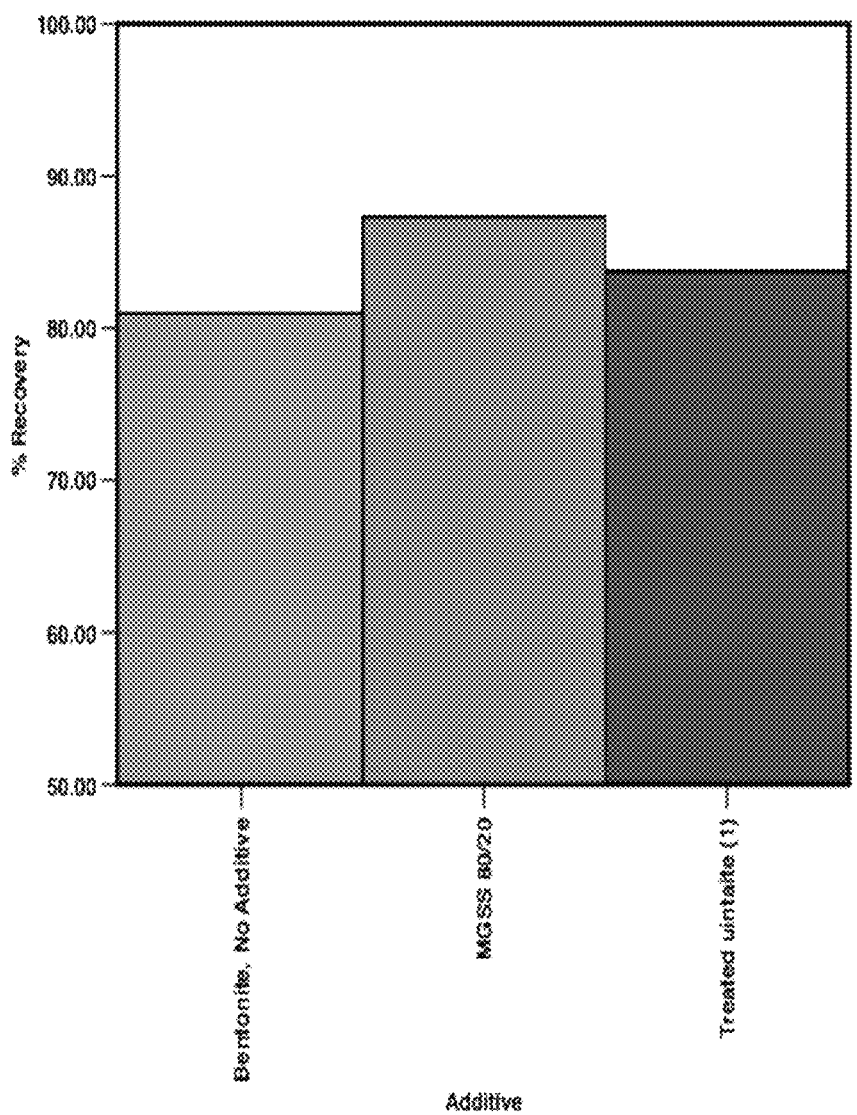
FIG. 10 is a graph or chart showing shale stability for a bentonite drilling fluid system with a second shale sample.

In a second set of tests shown in FIG. 10 using a different Pierre Shale sample, MGSS 80/20 was compared to treated uintaite. In these tests, the base drilling fluid gave higher recoveries than the first set (81.0% compared to 61.2%). The MGSS 80/20 (87.4% recovery) improved the recovery over the base drilling fluid by 6.4% whereas the uintaite (83.8% recovery) increased recovery by only 2.8%.

Figure 11:
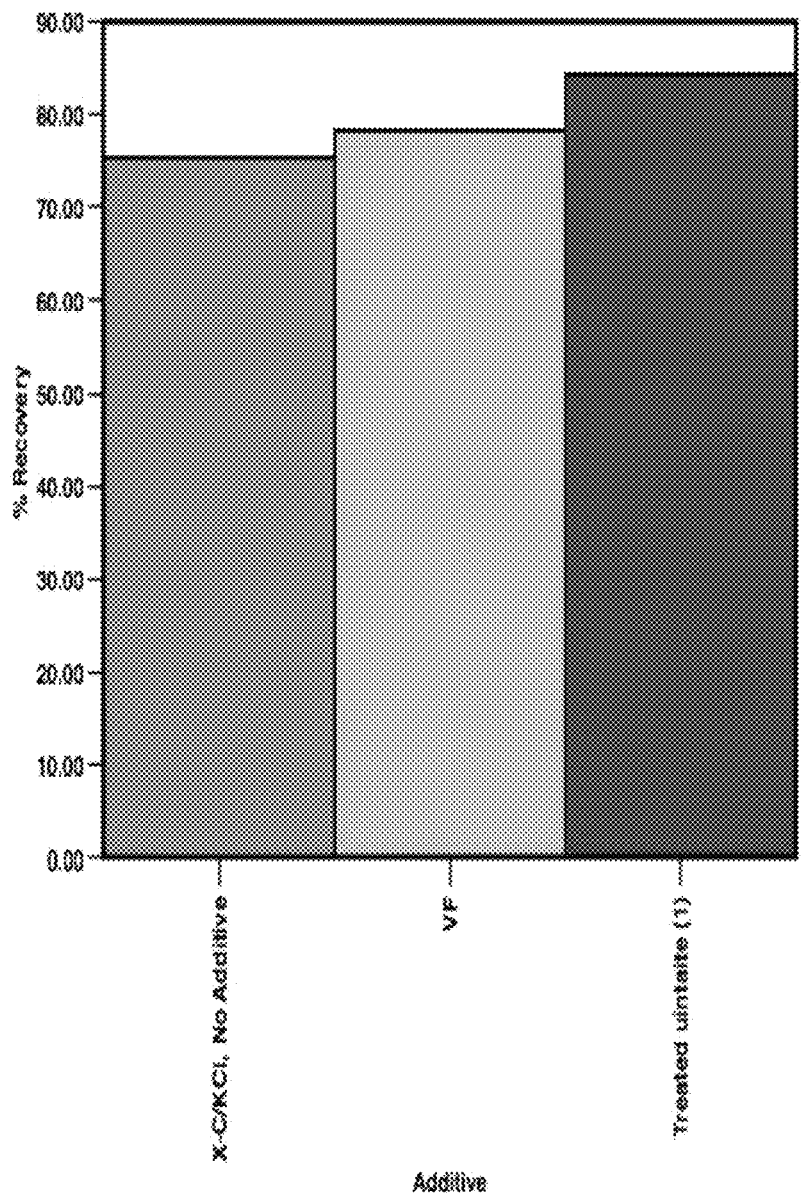
FIG. 11 is a graph or chart showing shale stability for a polymer/potassium chloride drilling fluid system with a first shale sample.

Shale Recovery in X-C Polymer/KCl Fluid:

In the first set of tests with an X-C polymer/KCl fluid shown in FIG. 11, the base X-C/KCl drilling fluid gave 75.4% recovery. In this fluid, VF was slightly better than the base fluid (2.9% better at 78.3% recovery), but not so good as the treat uintaite (9% better at 84.4% recovery).

Figure 12:
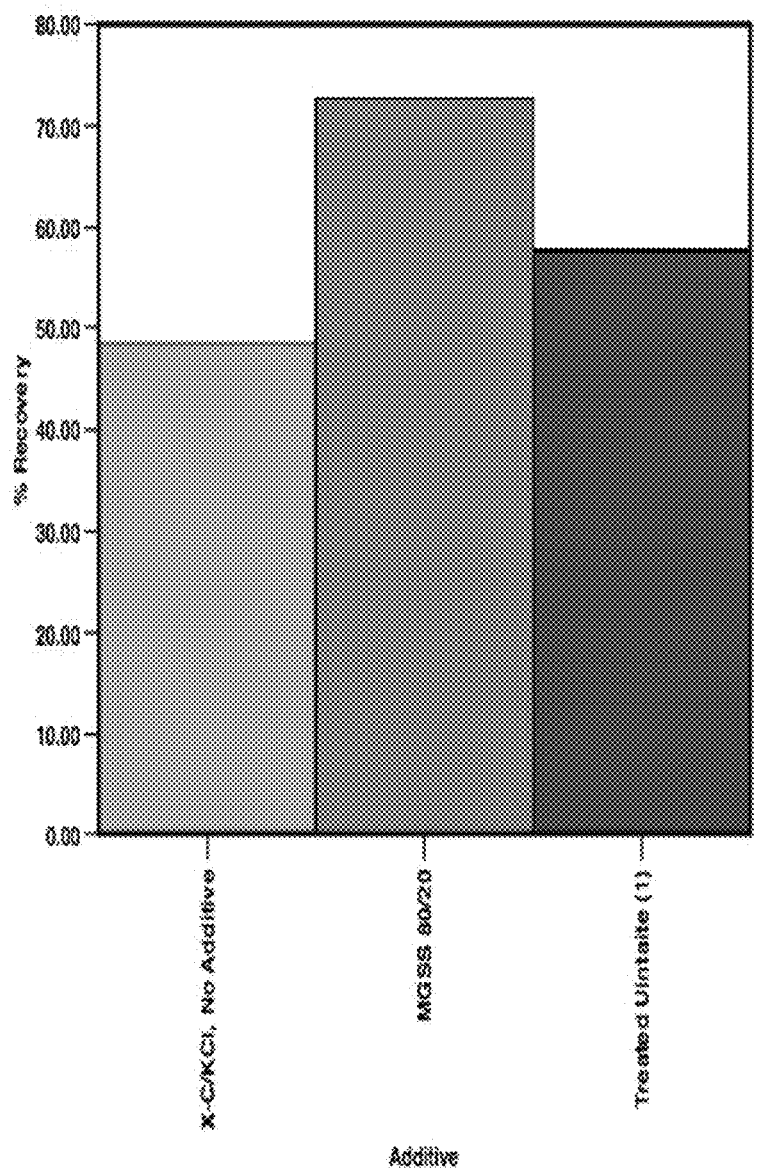
FIG. 12 is a graph or chart showing shale stability in a polymer/potassium chloride drilling fluid system with a second shale sample.

In the second set of tests as shown in FIG. 12 using a different Pierre Shale sample, the base X-C/KCl drilling fluid had 48.5% recovery. MGSS 80/20 was 24.2% higher at 72.7% whereas the treated uintaite improved recovery by only 9.3% at 57.8% recovery.

Experimental Procedures:

Bentonite Drilling Fluids: All the fluids tested contained water and bentonite. The base bentonite fluid was mixed on a Hamilton Beach multimixer for 5 minutes, scraped down and mixed an additional 10 minutes. The fluid was combined with additional samples and aged overnight. The base fluid was mixed with a paint mixer after aging. The additives were then added to individual lab barrels while mixing on the multimixer. The fluids were mixed for 5 minutes, scraped down and mixed an additional 10 minutes. The pH was adjusted to about 10 using 1 N KOH. The fluids were aged overnight at room temperature and rheologies measured after mixing 5 minutes and adjusting pH again. Rheologies were measured on an Ofite Model 900 rheometer at room temperature.

X-C Polymer/5% KCl Drilling Fluids: To make the base fluid, 350 g of 5% KCl in distilled water was added to a mixer cup. 1.0 gram X-C Polymer was slowly added to the cup with mixing on the multimixer, then 30 grams of Rev Dust was added with mixing. After 20 minutes on the multimixer, the appropriate amount of the product of interest was added slowly and mixed for 10 minutes. The pH was adjusted to about 10 with 1 N KOH solution. The samples were aged overnight. After aging, each sample was mixed 5 minutes and the pH readjusted before the rheological properties were measured and the fluid loss tests performed.

Syringe test: 45 grams of 20/40 sand was placed in a 60 mL plastic syringe. Tap the syringe with the syringe top, then tap the tip on the lab bench top to settle the sand which will come to about the 25 mL mark on the syringe barrel. Pour the fluid to be tested gently into the syringe so as not to disturb the surface of the sand. Fill to about the 53 mL mark. Insert the plunger. Hold the syringe and a 25 mL graduated cylinder with both hands so the tip of the syringe is in the neck of the graduated cylinder. Place the top of the plunger under a sturdy table top and push the barrel up with both hands with as much force as possible. When liquid stops flowing from the tip, release the pressure and measure the fluid collected in the graduated cylinder. If no liquid passes through the sand column, note the distance (in mL marks) from the top of the sand column to the level to which the liquid penetrated.

Modified API test using a sand bed: In the standard API fluid loss cell, pour 200 grams of 30/40 sand onto the screen at the bottom of the cell. Tap the side of the cell with a rubber mallet with some vigor to settle the sand. Ensure that the surface of the sand is level, but do not touch the surface. Pour 200 mL of the fluid to be tested slowly and gently through a 20 mesh or finer metal screen suspended about 0.5 cm above the sand surface. (The screen is cut to fit inside the API cell with three fine wires attached to form a handle by which the screen can be held above the sand and then gently withdrawn from the cell). Do not let the screen touch the surface while pouring the liquid. The goal is to disturb the sand surface a minimum amount. Assemble the cell as normal. Place a 250 mL beaker below the cell to catch effluent. Slowly open the nitrogen gas supply valve to the cell to bring the pressure in the cell to 100 psi. When liquid begins to flow into the beaker, start the 30 second timer. After 30 seconds, quickly exchange the beaker for another one and start the 30 minute timer. Measure the volumes of liquid expelled for both parts of the test. The recorded values are the sums of the two volumes.

In summary, the present invention directed to an additive for drilling fluid composed of a combination of bituminous coal having a selected particle size distribution and solvent extracted ground flaxmeal with the constituents in a selected percentage range by weight is an effective shale stabilizing agent and sealing agent.

Whereas, the present invention has been described in relation to the drawings attached hereto, it should be understood that other and further modifications, apart from those shown or suggested herein, may be made within the spirit and scope of this invention.

What is claimed is:

1. An additive for drilling fluid used as both a sealing agent to prevent seepage loss and a shale stabilizing agent in subterranean wellbores, which additive comprises:

ground bituminous coal having a selected particle size distribution wherein said bituminous coal is between 60% to 80% of the additive by weight, wherein the selected particle size distribution of the ground bituminous coal has 50% of its particles less than 75 microns and a median particle size of about 75 microns; and ground flaxmeal which is between 20% to 40% of the additive by weight.

2. An additive for drilling fluid as set forth in claim 1 wherein the ground flaxmeal is solvent extracted ground flaxmeal wherein oil is removed from the flaxmeal before use in said additive.

3. A drilling fluid comprising an additive used as both the sealing agent to prevent seepage loss and a shale stabilizing agent in subterranean wellbores, which additive comprises:

ground bituminous coal having a selected particle size distribution wherein said bituminous coal is between 60% to 80% of the additive by weight, wherein the selected particle size distribution of the ground bituminous coal has 50% of its particles less than 75 microns and a medium particle size of about 75 microns;

solvent extracted ground flaxmeal which is between 20% to 40% of the additive by weight, wherein the ground flaxmeal is solvent extracted ground flaxmeal wherein oil is removed from the flaxmeal before use in said additive; and wherein said additive is added to drilling fluid at a rate of between 3 to 6 pounds per barrel.

4. A drilling fluid comprising an additive as set forth in claim 3 wherein said drilling fluid is bentonite based.

5. A drilling fluid comprising an additive as set forth in claim 3 wherein said drilling fluid is polymer/potassium chloride based.

* * * * *